United States Patent [19]
Travor

[11] Patent Number: 5,800,123
[45] Date of Patent: Sep. 1, 1998

[54] BLADED PUMP CAPSTAN

[75] Inventor: Bruce W. Travor, Holland, Pa.

[73] Assignee: The United States of America as represented by the Secretary of the Navy, Washington, D.C.

[21] Appl. No.: 822,083

[22] Filed: Mar. 20, 1997

[51] Int. Cl.⁶ .................. F03B 1/02; F03B 7/00; B66D 1/08

[52] U.S. Cl. .............. 416/85; 416/93 A; 416/146 R; 416/175; 416/193 R; 416/197 A; 416/198 R; 416/201 A; 254/199; 254/361

[58] Field of Search ............... 416/85-86, 93 A, 416/146 R, 175, 189, 193 R, 197 A, 198 R, 201 A, 203; 415/77, 79; 254/199, 361, 377

[56] References Cited

U.S. PATENT DOCUMENTS

| | | | |
|---|---|---|---|
| 3,143,283 | 8/1964 | Downs | 415/77 |
| 4,159,191 | 6/1979 | Graybill | 416/189 |
| 4,523,664 | 6/1985 | Soubry et al. | 254/377 |
| 4,722,422 | 2/1988 | Hiraoka | 254/377 |
| 4,737,070 | 4/1988 | Horiuchi et al. | 416/86 |
| 5,333,996 | 8/1994 | Bergstein | 416/197 A |

FOREIGN PATENT DOCUMENTS

| | | | |
|---|---|---|---|
| 683650 | 4/1964 | Canada | 416/197 A |
| 1901389 | 1/1980 | Germany | 254/362 |
| 46-5496 | 10/1971 | Japan | 254/361 |

*Primary Examiner*—Christopher Verdier
*Attorney, Agent, or Firm*—Ron Billi; Louis Allahut

[57] ABSTRACT

An apparatus for tensioning a subsurface float line and the like during deployment of the line and thereafter includes a capstan rotatably mounted and located in a liquid medium, the capstan having a bore extending from one end of the capstan to the other end, the bore including a plurality of pump blades for moving the liquid through the bore when the capstan is rotated, the capstan also including turbine blades located around the circumference of the capstan and adjacent both ends of the capstan, the capstan also including a circular surface interposed between the turbine blades for communicating with the line to be tensioned. The pump and turbine blades do work when the capstan is rotated thereby creating a counter rotational (drag) force that tensions the line during and after deployment.

5 Claims, 2 Drawing Sheets

BLADED PUMP CAPSTAN

STATEMENT OF GOVERNMENT INTEREST

The invention described herein may be manufactured and used by or for the Government of the United States of America for government purposes without the payment of any royalties thereon and therefor.

BACKGROUND OF THE INVENTION

The present invention relates to capstans for tensioning and holding the tension of subsurface float lines that are subject to heavy seas, strong currents and the like. More specifically, but without limitation, the present invention relates to a bladed pump capstan for use in tensioning and holding the tension of subsurface float lines, the capstan having a bore through its center with pump blades located therein and also having turbine blades located around the circumference of the capstan for providing a drag on the capstan when the capstan is operated in a medium, such as, water.

It is often desirable and preferable to position and tension subsurface float lines by means of a capstan located on a descending buoy cable package. This operation requires an apparatus that can provide a drag force on the tensioned line during both initial placement of the line and thereafter when the float is subjected to tide, current and wind forces. One such apparatus utilizes a capstan with one or more paddle wheels positioned and arranged around the circumference of the capstan. The capstan is operated in a medium, such as, water and the line is paid out via the capstan. The rotating paddle wheels thus do work to displace the water. This rotation of the paddle wheels produces a tension force on the line that assists in deployment of the float and in maintaining the position of the float after initial deployment. Although successful, this apparatus has many shortcomings. First, the paddle wheels must be very large and tension line entanglement is therefore a problem. Second, to compensate for size, the capstan diameter is small thus requiring the tensioned line to pay out over a tight curvature. When using a preferred line material, such as kevlar, the line easily becomes damaged due to excessive bending. Third, a disposable shield is used to protect the tensioned line from entanglement thus requiring additional maintenance and complexity.

It is thus desirable to provide a capstan with a sufficient diameter to prevent damage to a tensioned line, such as kevlar. It is also desirable to provide a capstan that utilizes water friction as the means of tensioning the line. It is also necessary that the apparatus occupy a minimum space and be simple and easy to maintain and operate.

SUMMARY OF THE INVENTION

Accordingly, the preferred embodiment of the present invention includes a rotatable capstan having a bore extending from one end of the capstan to the other end of the capstan, the bore including a plurality of pump blades positioned and arranged around the bore. When the capstan is rotated while immersed in a liquid medium such as water, the pump blades do work while causing the water to be moved from one end of the capstan to the other end of the capstan thus creating a counter rotational (drag) force. The capstan also includes two sets of turbine blades positioned and arranged around the circumference of the capstan, one set located adjacent one end of the capstan and the other set adjacent the other end of the capstan. The turbine blades do work when the capstan is rotated by moving through the water thus creating a counter rotational (drag) force. A circular surface is located between the 2 sets of turbine blades for communicating with a line to be tensioned and the surface is tapered from a maximum diameter adjacent one set of turbine blades to a minimum diameter adjacent the other set of turbine blades. A minimum diameter is desirable to prevent damage to the tensioned line and is dependent on the characteristics of the line to be tensioned. When rotated, the capstan does work thus creating a resistance (i.e. a counter rotational moment) to impede the rotation of the capstan and thus cause the line to remain tensioned. The capstan is rotatably mounted on a shaft.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
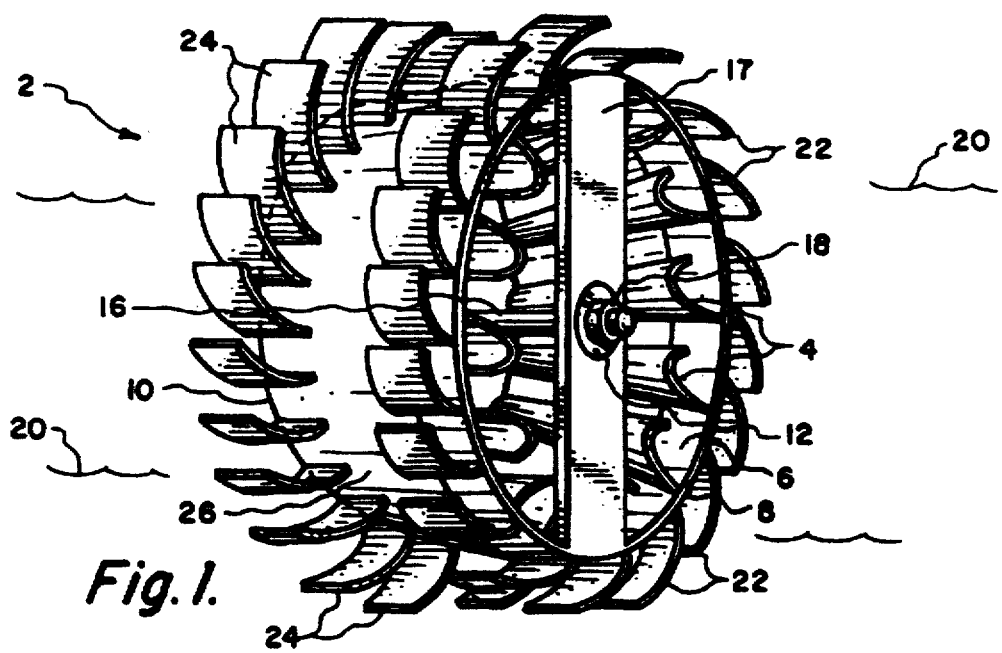
FIG. 1 is a perspective view of the present invention.
Figure 2:
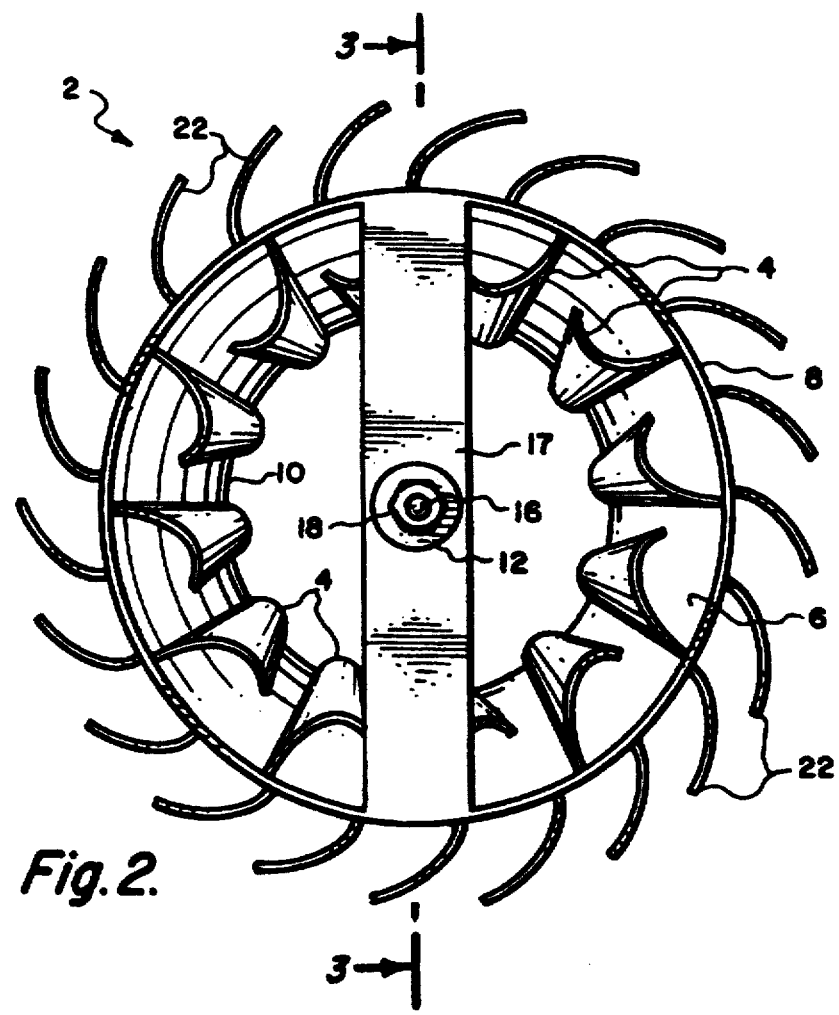
FIG. 2 is an end view of the present invention.
Figure 3:
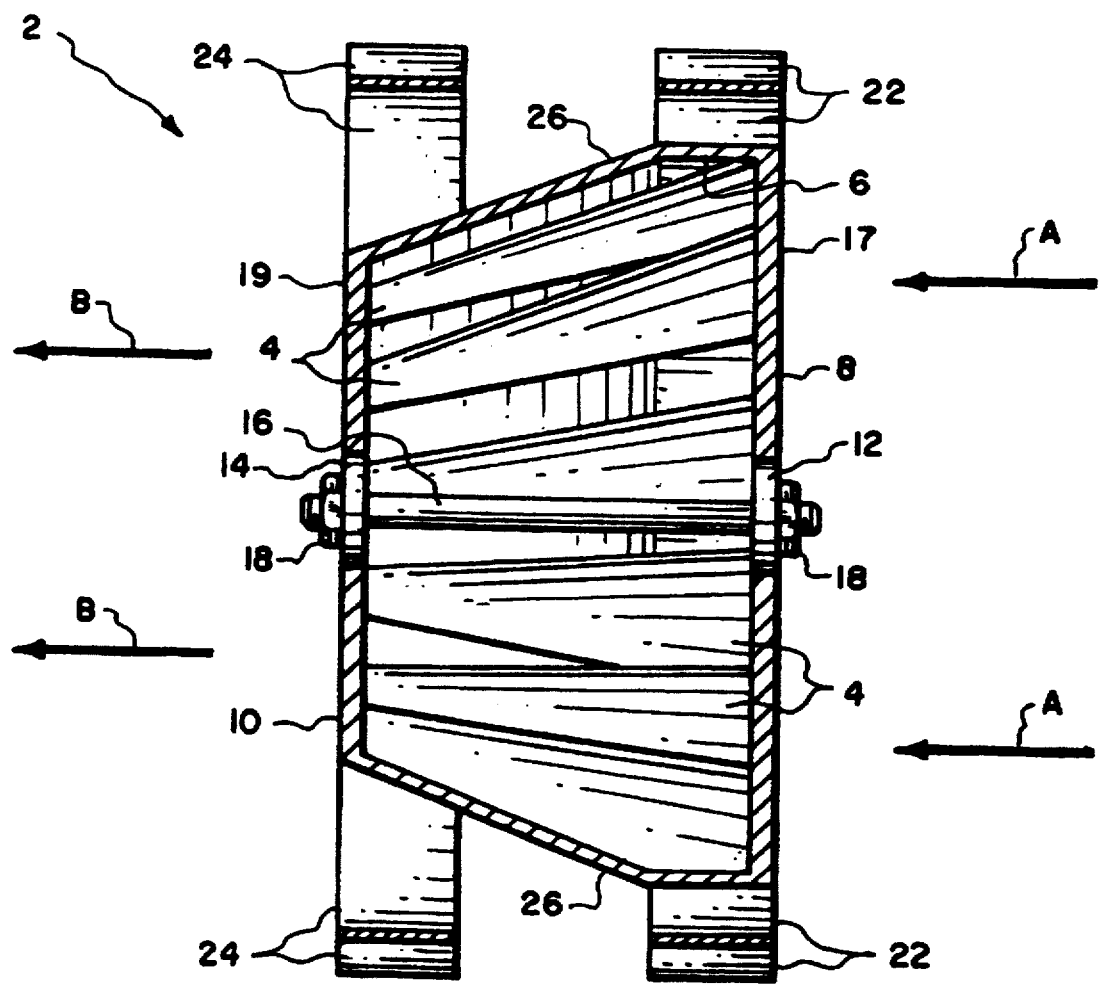
FIG. 3 is a cross section of the present invention taken through section 3—3 of FIG. 2.

The preferred embodiment of the present invention is illustrated by way of example in FIGS. 1–3. As shown in FIG. 1, capstan 2 is submerged in the preferred water medium 20 and includes a plurality of pump blades 4 located around and depending inwardly from bore 6. Bore 6 extends from end 8 to end 10. Note, that in the preferred embodiment, the diameter of bore 6 at end 8 is greater than the diameter of bore 6 at end 10. Accordingly, pump blades 4 are larger at end 8 and smaller at end 10. Other pump types and blades may be substituted by those skilled in the art. As shown in FIG. 2, capstan 2 is supported on shaft 16 via bearing 12 on one end and via bearing 14 on the other end. Bearings 12 and 14 are pressed into supports 17 and 19 respectively. Nuts 18 secure capstan 2 in place on shaft 16. It can thus be seen (FIG. 3) that as capstan 2 rotates, pump blades 4 cause water 20 to enter bore 6 in the direction of arrows A and exit bore 6 in the direction of arrows B thus doing work and providing a counter rotational moment (drag) about shaft 16. Other liquid mediums and non-liquid mediums, such as gases may be substituted by those skilled in the art so that work may be done by the rotating pump blades and turbine blades.

Capstan 2 includes a plurality of turbine blades 22 first set located adjacent end 8 and a plurality of turbine blades 24 second set located adjacent end 10. FIG. 3 shows turbine blades 22 evenly spaced around the circumference of capstan 2. Note that turbine blades 22 and 24 are curved with the open portion facing towards the direction of rotation. It can thus be seen that when capstan 2 rotates, turbine blades 22 and 24 (and pump blades 4) provide a counter rotational moment (drag) about shaft 16.

Circular surface 26 is located between turbine blades 22 and 24 and tapers from a maximum diameter adjacent turbine blades 22 to a minimum diameter adjacent turbine blades 24. It should be noted that the minimum diameter of surface 26 may vary according to the characteristics of the line to be deployed and the conditions under which the line is to be operated. Under such operating parameters, the diameter of surface 26 should be sized so that the minimum bend radius of the line is not exceeded. Surface 26 communicates with the line, the line coiled around surface 26 one or more turns, for example.

Obviously many modifications and variations of the present invention are possible in light of the above teachings. It is therefore to be understood that within the scope of the appended claims, the invention may be practiced otherwise than as specifically described.

What is claimed is:

1. An apparatus for tensioning a line and holding the line in tension during and after deployment of said line, the apparatus located in a fluid medium, the apparatus comprising:
   a) a rotatable capstan;
   b) first means located in the capstan for moving the fluid medium when said capstan is rotated;
   c) second means located around the outer circumference of said capstan for moving said fluid medium when said capstan is rotated;
   d) third means located around the outer circumference of said capstan for communicating with said line;
   wherein said first and said second means provide a counter rotational force to said capstan and said line when said capstan is rotated by said line.

2. An apparatus for tensioning a line and holding the line in tension during and after deployment of said line when the apparatus is located in a fluid medium, the apparatus comprising a rotatable capstan having a bore extending from one end of the capstan to the other end of said capstan, the bore including a plurality of pump blades located around and depending inwardly from said bore, said pump blades communicating with said fluid medium to cause said fluid medium to be moved through said bore of said capstan when said capstan is rotated, said capstan also including a plurality of turbine blades located around the circumference of said capstan and adjacent each end of said capstan, said turbine blades communicating with said fluid medium to cause said fluid medium to be moved when said capstan is rotated, said capstan having a surface between said plurality of turbine blades for communicating with said line, said apparatus providing a counter rotational moment when said apparatus is caused to be rotated by said line.

3. The apparatus defined in claim 2, wherein said turbine blades are curved and have an open portion, the open portion facing the direction of rotation.

4. The apparatus defined in claim 3, wherein said bore in said capstan is larger at one end of said capstan and smaller at the other end of said capstan.

5. The apparatus defined in claim 4, wherein said surface between said turbine blades tapers from a maximum diameter adjacent said turbine blades at said one end of said capstan to a minimum diameter adjacent said turbine blades at the other end of said capstan.

\* \* \* \* \*